United States Patent
Helin

(10) Patent No.: US 11,447,256 B2
(45) Date of Patent: Sep. 20, 2022

(54) HUMIDIFIER ESPECIALLY FOR AIRCRAFTS

(71) Applicant: CTT SYSTEMS AB, Nyköping (SE)

(72) Inventor: Robert Helin, Vagnhärad (SE)

(73) Assignee: CTT SYSTEMS AB

( * ) Notice: Subject to any disclaimer, the term of this patent is extended or adjusted under 35 U.S.C. 154(b) by 19 days.

(21) Appl. No.: 15/972,444

(22) Filed: May 7, 2018

(65) Prior Publication Data

US 2018/0327098 A1 Nov. 15, 2018

(30) Foreign Application Priority Data

May 9, 2017 (EP) ..................................... 17170163

(51) Int. Cl.
| | |
|---|---|
| *B64D 13/06* | (2006.01) |
| *F24F 6/04* | (2006.01) |
| *F24F 6/00* | (2006.01) |
| *F24F 13/04* | (2006.01) |
| *F24F 13/06* | (2006.01) |

(52) U.S. Cl.
CPC ................ *B64D 13/06* (2013.01); *F24F 6/00* (2013.01); *F24F 6/04* (2013.01); *F24F 13/04* (2013.01); *F24F 13/06* (2013.01); *B64D 2013/0625* (2013.01); *B64D 2013/0662* (2013.01); *B64D 2013/0688* (2013.01)

(58) Field of Classification Search
USPC .......................................................... 454/76
See application file for complete search history.

(56) References Cited

U.S. PATENT DOCUMENTS

| | | | |
|---|---|---|---|
| 2,204,016 A | 6/1940 | Karlson | |
| 4,771,611 A * | 9/1988 | McNab | ................... F24F 3/147 62/311 |
| 5,518,525 A | 5/1996 | Steed | |
| 5,524,848 A * | 6/1996 | Ellsworth | .............. B64D 13/00 244/118.5 |
| 5,699,983 A | 12/1997 | Ellsworth | |

(Continued)

FOREIGN PATENT DOCUMENTS

| | | |
|---|---|---|
| DE | 100 45 482 A1 | 5/2001 |
| EP | 0 779 207 B1 | 3/2000 |

(Continued)

OTHER PUBLICATIONS

Adiabatic_adj._and_n._Oxford English Dictionary (Year: 2021).*
Japanese Notice of Reasons for Refusal for JP 2018-089916; dated Aug. 3, 2021; 8 pages.

*Primary Examiner* — Steven B McAllister
*Assistant Examiner* — Charles R Brawner
(74) *Attorney, Agent, or Firm* — Barclay Damon LLP

(57) ABSTRACT

A humidifier, preferably for aircrafts, includes a humidifier device, an outlet fan as well as a heat exchanger and a heat exchanger fan. The humidifier device is provided with an intake for a mixture of non-humidified air and recirculated air as well as an outlet for the air mixture. A recirculation fan is placed in a recirculation loop between the outlet and the intake so that a portion of the air mixture should be recirculated back to the humidifier device. An aircraft can be equipped with such a humidifier and a humidifier method used in an aircraft.

13 Claims, 4 Drawing Sheets

(56) References Cited

U.S. PATENT DOCUMENTS

| | | | | |
|---|---|---|---|---|
| 5,775,121 A | * | 7/1998 | Kuma | F24F 5/0007 |
| | | | | 62/314 |
| 5,944,284 A | | 8/1999 | Bardel | |
| 2002/0096312 A1 | * | 7/2002 | Korin | B01D 53/22 |
| | | | | 165/58 |
| 2008/0283663 A1 | * | 11/2008 | Space | B64D 13/06 |
| | | | | 244/118.5 |
| 2011/0180618 A1 | * | 7/2011 | Schumacher | B64D 13/00 |
| | | | | 236/44 A |
| 2015/0140914 A1 | * | 5/2015 | Schneider | B64D 13/00 |
| | | | | 454/76 |

FOREIGN PATENT DOCUMENTS

| | | |
|---|---|---|
| GB | 325515 | 2/1930 |
| JP | 2004-226033 A | 8/2004 |
| WO | WO 87/01436 | 3/1987 |
| WO | WO 2008/065709 A1 | 6/2008 |

* cited by examiner

HUMIDIFIER ESPECIALLY FOR AIRCRAFTS

CROSS REFERENCE TO RELATED APPLICATION

This application claims priority of EP Application No. 17170163.4, filed May 9, 2017, under applicable portions of 35 U.S.C. § 119. This application is incorporated by reference in its entirety herein.

TECHNICAL FIELD

The present invention relates to air treatment equipment, especially for aircrafts wherein such equipment is installed in the pressurized zone of the aircraft.

BACKGROUND OF THE INVENTION

An aircraft operates normally in an environment wherein a human being cannot survive. It has been aimed at bringing about an environment inside the aircraft wherein the human being safely should be able to travel at high altitude where the pressure otherwise would have been too low. As development has proceeded, it is considered that in modern aircrafts, the pressure level in the cabin is now so high that further improvements do not need to be made in respect of the cabin pressure. The background of the invention relates to attending to other factors that make the environment in an aircraft trying. The well-being of the passengers often becomes impaired because of the other conditions in the cabin less suitable to human beings, among which the problems of very low air humidity have been experienced and more scientifically known since long. Among other things the eyes and the skin are irritated, the exposed mucous membranes of the body dry out at a higher rate, which may cause many problems and may impair the well-being markedly. One simply doesn't experience the same wellness during and after a flight, it is not as being on the ground. In addition to dry, itchy skin and irritated, gritty eyes, the low air humidity causes a reduced defense capacity against bacteria and viruses.

In the human being, there is a natural defense against infections in the MUCOUS membranes of the nose. In the mucous membranes, there are antibodies which counteract viruses, bacteria, mold spores, and allergens and prevent them also from reaching the tissue under the mucous membrane and thereby the body. In the mucous membrane, there is in addition a so-called mucocilar clearance. It consists of cilia, which by means of the motor protein dynein are brought into a whipping motion so that the mucous membrane which traps the infectious agents and other contaminants continuously is brought away from nose and throat to the abdomen where they are destroyed by acids in the stomach. However, when the air is dry, the mucus dries and the defense against infections becomes impaired thereby, the mucus becomes too thick to be efficiently moved by the cilia and it has been shown experimentally that the mucocilar clearance, in addition to slowing down dramatically, may stop entirely in dry air (Barry et al., 1997, Salah et al., 1988). Naturally, this disturbs the defense against infections and makes the human more susceptible to disease. Most infections reach the human being via the mucous membranes and therefore well working protective mechanisms in the mucous membranes are important to counteract infections. Also the mucous membranes and tears of the eye work as a protection for the human being and they are also dependent of good moisture for optimal function. A healthy film of tears is critical for an optimal optical quality, nutrient supply, and for the antibacterial defense mechanism in the eye. The typical relative humidity in aircraft cabins for flights for more than one hour is often lower than 10% during the greater part of the journey, but often the relative humidity (RH) drops to less than 5% on longer flights. Also, the lower pressure in an aircraft cabin at high altitude aggravates the dehydration mechanism that affects different parts of the body. Studies (Martin B. et al., 2004) have demonstrated that air travel multiplies frequencies of colds compared with not flying, implying that the environment in the aircraft and the increased susceptibility to patogenes may cause implications to the traveler also some time after the journey with work loss and impaired quality of life upon falling ill and this also to relatives and other people to whom the infected passenger may spread the infection.

Other reasons for impaired well-being when travelling by air are impact from ozone, other undesired gases, and wrong temperature in the cabin. Ozone, which is a very strong oxidant, is often claimed to cause a number of inconveniences, e.g., cough, throat irritation, pain, burning, or discomfort in the chest when taking a deep breath. Ozone is further claimed to be able to cause a feeling of pressure across the chest, sibilant respiration, and difficulty in breathing. Ozone is soluble in water but the solubility is limited, and therefore ozone reaches the very innermost parts of the lungs and reacts with the cells therein with many possible unhealthy consequences, e.g., ozone reacts with proteins and lipids on the cell surfaces in the epithelial fluid, which may be as thin as 0.2 μm in the alveoli region, this may damage the cells and lead to a chain of reactions which among other things may cause inflammation, which, i.a., is seen in the web page www.epa.gov/apti/ozonehealth administered by a federal environmental protection agency in USA.

Prior art for reducing the ozone content comprises so-called ozone converters which reduce the ozone. Ozone converters are further known to not maintain their capacity over time and thus need to be replaced by new or conditioned replacement units. Also bleeding temperature of 400° C. decomposes ozone but is not reliable because of the temperatures not always being achieved. Concerning above mentioned undesired gases, VOC (Volatile Organic Compounds) and SVOC (Semi-Volatile Organic Compounds) may be mentioned. In the cabin air, gases have occasionally been measured that are more or less toxic, e.g., tricresyl phosphate and other lubricating oil contaminants and their pyrolysis residues. Presence of these gases stresses the human being differently and in the worst case, individuals may become ill from these. There are proposals of filters for the ventilating system which would remove undesired gases, but such are not introduced in today's planes. Neither do filters located in the beginning of the ventilating chain remove contaminants arising further down in the ventilating chain up to the passenger and contaminants generated when the air is agitated in the cabin, for instance evaporization from chemicals and plastics or residual products from ozone which react with VOC, interior fittings, and skin oils, for instance.

Due to the defense against infections being reduced by the environment, it is then possible, in addition to via direct physical transfer, for instance via the hands, to get infection through the air since in an aircraft cabin, the person density is high and the air is agitated in the cabin and is mixed between the people. Infections have among other things been reported two rows of seats in front of and two rows of seats behind an infected person. Diseases that communicate infection via air are, for instance, tuberculosis, influenza, meningococcus, measles, and SARS.

In order to attack the problem of the extremely low air humidity in aircrafts, there have been made attempts with different humidifying solutions, for instance spray nozzles, rotating plates which atomize water into droplets, steam boiling, and adiabatic contact humidifiers. Humidifiers which make use of drops of water transmit the minerals in the water if there is no access to demineralized water and the drops also transmit possible infectious agents in the water. Spray nozzles have also problem of clogging of the opening of the nozzle, which is critical for a satisfactory evaporization of the water. Both existing steam humidifiers and contact humidifiers are considered sterile since they do not transmit infectious agents or minerals to the air, but as they are installed to humidify entire cabin zones, the moisture level is limited to about 20% of relative air humidity (RH) by the risk of condensation in the aircraft structure, and in addition water and high-grade energy are consumed for the humidifying of the entire cabin space.

The patent specification EP 0779207 (B64D 13/00) discloses a moisture device for the cabin in an air vehicle. This device comprises atomizers having atomizing nozzles installed in the passengers' seatback, the ceiling, or in the interior of the luggage racks. In all embodiments shown in this patent specification, water is supplied to the cabin air by atomizing water fetched from some kind of reservoir connected to the device.

A disadvantage of this known device is that it releases aerosols in the cabin, which work as carriers of infectious agents and minerals. Furthermore, a humidifying at normal cabin pressure from 5% RH at 24° C. to a moisture content corresponding to 30% at 24° C. with this device requires, for instance, a temperature drop of about 14° C., which results in a cold shower, if it even is managed to evaporate such an amount of water in this way, because it is difficult to evaporate much water using this method. The limited amount of water that is practically possible to be supplied in this way would correspond to a more limited relative humidity, and the temperature drop would still become 2.5° C. per gram supplied water per kilogram air, which would soon also be experienced as cold, the colder the more the air in this way is managed to be humidified. The cooling down effect limits to a very high extent how much it is actually possible to humidify using the method that is disclosed in the patent.

SUMMARY OF THE INVENTION

One object of the present invention is to eliminate or considerably alleviate the effect of several or all of said problems.

Another object of the invention is further to provide a local climate with high air humidity and cleaned air.

Yet another object is further to be able to cool and heat the air according to desires.

Accordingly, an object is further to be able to use low-grade energy from the surroundings in order to obtain an economic climate solution.

A further object is also to be able to use electricity in order to obtain a compact, simple unit having small outer dimensions.

Yet another object is also to be able to use optional source of energy in order to obtain an expedient supply of energy to the humidifying process.

In addition, an objective is providing a device according to the invention that should be able to be used for many target groups.

By the present invention, such as this is seen in the independent claims, the above-mentioned objects are met, wherein said disadvantages have been eliminated. Suitable embodiments of the invention are defined in the dependent claims.

The present invention affords a relatively high relative humidity (RH) at correct temperature. Instead of using a refrigerating machine, the dry air and the low cabin pressure can be utilized, which results in a very strong cooling potential in adiabatic humidifying. The cold obtained in the humidifying can be provided for by decreasing the hot surrounding air current through the heat exchanger or by decreasing the supply of energy to the humidifying process when other sources of heat are used. It is also advantageous to be able to give both cooling and heating. Normally, the cold is reduced by hot ambient air through the heat exchanger or by increasing the supply of energy to the humidifying process in another way and in addition to these, further heating can be provided by supply of energy.

The present invention may use contact humidifiers and can thereby be considered sterile, it has possibility of humidifying to much higher moisture levels than allowed by current technique. The levels that are possible to achieve correspond to or exceed summer mean values of Mexico City (which also has approximately the same barometric pressure as in the cabin), which in theory would enable a comfort that corresponds to being on the ground on locations corresponding to Mexico City in the summer. The cold of the final temperature can be significantly limited without using much high-grade energy. The humidifier can reach these high levels by the use of energy in the cabin air which is low-grade, or by means of electric heat for a more compact unit or by means of other optional source of energy. The humidifying is only local when the water consumption becomes low. Since the high air humidity is only local, it will neither cause condensation problems in the rest of the plane as the local moist air subsequently is diluted with the rest of the dry ventilating air of the aircraft. The cooling effect of the humidifier can also be utilized for individual temperature control with cold without refrigerating machine with or without equipment for reheat.

In embodiments of the invention, the device is provided with an integrated filter, preferably a HEPA filter (High Efficiency Particulate Arrestance), which together with a displacement or even laminar supply method embeds the passenger in cleaned moist air which prevents intrusion of other non-cleaned and dry air. The air in said supply method has a lower tendency to co-eject surrounding dry and polluted air in its own jet, which maximizes the air humidity and the cleanness of the air reaching the passenger. In addition, it is aimed at an optimal cautious flow in order not to blow away the thin, more moist microclimate which is present closest to the skin, which otherwise may get a dehydrating effect. Said HEPA filter for the removal of particles, bacteria, and viruses may be prepared for extensively also removing ozone, this together with the visualized displacement laminar flow appliance would be able to provide a local environment for the passenger, then also with a much lower ozone concentration. Said HEPA filter may also be prepared for removing gases and together with the visualized supply method, the HEPA filter would also be able to provide a local environment for the passenger with a much lower concentration of undesired gases. Besides for regular passengers, the invention can be used for providing an ideal climate for pilots, in the rest areas of the crew, and also in specific places in VIP aircrafts as examples. The invention is well suitable for so called high wall suites wherein the local, screened space is ideal for providing a beneficial climate with clean moist air.

The invention concerns a humidifier, preferably for aircrafts, comprising a humidifier device, an outlet fan as well as a heat exchanger and a heat exchanger fan. Alternatively, an electric heater is employed instead of a heat exchanger with heat exchanger fan for a more compact design. The humidifier device is provided with an intake for a mixture of non-humidified air and recirculated air as well as an outlet for said air mixture. A recirculation fan is placed in a recirculation loop between the outlet and the intake for a portion of the air mixture to be recirculated back to the humidifier device.

In one embodiment of the invention, an outlet fan is connected to the outlet for a portion of said air mixture to be conveyed to air consumers, preferably passengers in an aircraft.

In one embodiment of the invention, the heat exchanger, the heat exchanger fan, and the recirculation fan are placed in the recirculation loop for heat exchange between ambient air and recirculated air. Alternatively, an electric heater is employed instead of a heat exchanger with heat exchanger fan for a more compact design.

In one embodiment of the invention, the outlet fan is placed outside the recirculation loop.

In one embodiment of the invention, the outlet fan and the recirculation fan form a common fan.

In one embodiment of the invention, a duct system is connected to the outlet of the humidifier wherein the duct system forms the recirculation loop and the heat exchanger as the surface of the duct absorbs heat from the surroundings, then the duct absorbs heat loads which often are present in, for instance, aircrafts' crown spaces and transmits it to the air which then uses it in the humidifying process.

In one embodiment of the invention, at least one consumer appliance is connected to the duct system to allow the air mixture to be conveyed locally to at least one air consumer or group of air consumers.

In one embodiment of the invention, a local climate appliance is connected to at least one consumer appliance.

In one embodiment of the invention, a filter, preferably a HEPA filter, is placed in the air humidifier either at the entrance of the air humidifier for the filtering of all new non-humidified air or at the exit of the air humidifier for the filtering of all moist air.

In addition, the invention concerns a pressurized aircraft which delimits a high pressure in a pressurized cabin from a low pressure outside the same during flying. The aircraft comprises a humidifier according to what has been described above and which is placed in the pressurized zone.

In one embodiment of the invention, a duct system is connected to the humidifier for the distribution of humidified air, which duct system is placed in pressurized zone. To the duct system, there is connected at least one consumer appliance to which at least one local climate appliance is connected, which all said appliances are placed in the pressurized cabin.

In one embodiment of the invention, the heat exchanger of the humidifier is connected to the pressurized cabin for utilizing heated cabin air to the heat exchanger.

Furthermore, the invention concerns a humidifier method in which non-humidified air is conveyed to an intake of a contact humidifier pad wherein the air is humidified to a higher humidity level for subsequently, as recirculated moist air, being conveyed into a recirculation loop for re-transportation to the intake of the contact humidifier pad for a repeat of the humidifying, a portion of the recirculated moist air being diverted from the recirculation loop for further transportation to consumer.

In one embodiment of the invention, the recirculated moist air is conveyed through a heat exchanger placed in the recirculation loop in which heat exchanger, the recirculated moist air is heated. Alternatively, an electric heater is employed instead of a heat exchanger for a more compact design, for instance an electric heater, PTC heater having a low Curie point, or another optional source of heat.

In one embodiment of the invention, heated cabin air in an aircraft is conveyed through the heat exchanger.

Variants of the invention are to use electric heater wherein electricity consumption is acceptable. A variant of the invention is to form the humidifier with large side surfaces which absorb heat. In the application in aircrafts with central air supply to seats, so-called "individual air gaspers", all this air is treated before it is distributed out in the cabin. Traditional air gasper nozzles may then be replaced by appliances which with their adapted flow better shut out surrounding air from the treated air. The drawing off from this humidified "trunk" may be used for many different places where treated air is desired in this way. Alternatively, the duct system for individual air may be a part of recirculation loop which then works as the heat exchanger in the invention. Then the heat exchanger efficiency becomes automatically high as the surface of the trunk is large and the tubes usually are uninsulated. The heat exchanging properties of the trunk can also be improved as the trunk in both the cases contributes to removing heat from the space above the ceiling of the aircraft, even if the cooling effect is not constant, the cold can reduce the number of faults related to strong heat of, for instance, electronics. The loop which may be the trunk of air gaspers passes a box which in addition to a humidifier contains a fan which drives around the air in the loop and through the humidifier. Such a fan is power-saving since the rotational speed of the fan can be adapted according to the moisture level in the loop. For instance, if there is few consumers and/or high exchange of energy between the loop and the surroundings, then the moisture level increases and the fan can in this case decrease the recirculation. In doing so, the operation of the fan and the water consumption becomes demand controlled. Another fan which provides the system with air from the outside is arranged to maintain a certain pressure in the loop, the fan operating depending on how much humidified air that is drawn out from the loop, which also contributes to the fan being able to run demand controlled.

BRIEF DESCRIPTION OF THE DRAWINGS

Now, the invention will be described in more detail, references being made in connection with the accompanying drawing figures. The drawing figures show only explanatory sketches intended to facilitate the understanding of the invention.

DESCRIPTION OF THE INVENTION

Figure 1:
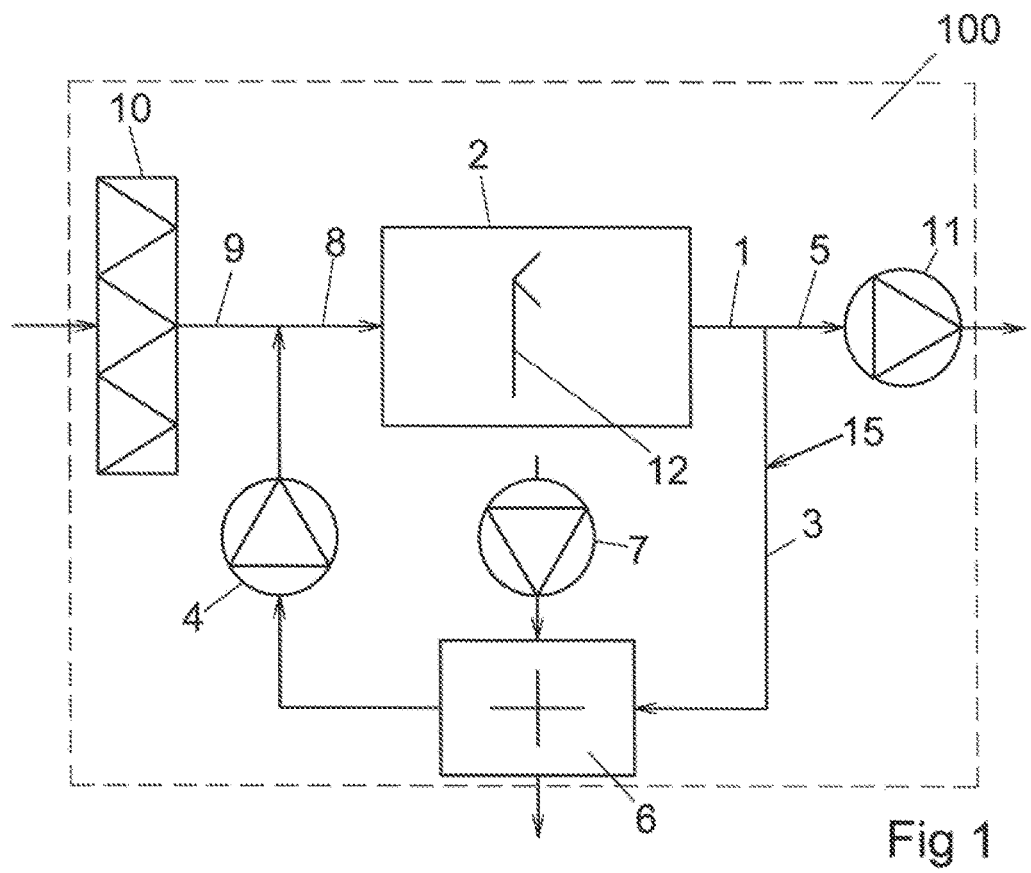
FIG. 1 shows a first embodiment of the invention.

FIG. 1 shows a first embodiment of a humidifier 100 of recirculation type according to the invention with high degree of humidifying utilizing low-grade energy or other energy. Total amount of moist air at an outlet 1 has passed and in that connection been humidified in a contact humidifier pad 2, which is soaked by optional method. Preferably, water is supplied to the humidifier from a dedicated container or from a freshwater system. The water to the contact humidifier pad 2 is preferably supplied by means of a pump which circulates the water from a trough or the water and is brought directly onto the contact humidifier pad 2 from the water container or from the freshwater system, the embodiment not being limited to other methods of water application. When the air passes the contact humidifier pad 2, water evaporates from the contact humidifier pad 2 and the temperature of the water and air falls. Hardly no energy is supplied the process in the contact humidifier pad 2 and the process is therefore adiabatic.

A portion of the total amount of moist air at the outlet 1 is deflected by means of a recirculation fan 4 when it exits the contact humidifier pad 2 and forms recirculated moist air 3. The remaining portion of the total amount of moist air from the outlet 1 proceeds, as recirculated moist air 5, to the consumer. Recirculated moist air 3 passes a heat exchanger 6 which takes its energy from surrounding air by means of a heat exchanger fan 7, the recirculated moist air 3 being heated and returned to an intake 8 in the contact humidifier pad 2 and proceeding into the contact humidifier pad 2 together with new non-humidified air 9 which replaces the recirculated moist air 5 that goes to the consumer. Thus, the air arriving to the intake 8 of the contact humidifier pad 2 is a mixture of new non-humidified air 9 and previously recirculated moist air 3. As seen in the figure, the recirculation fan 4 is placed after the heat exchanger 6 in a recirculation loop 15. By adapting these flows and component dimensions and performance, provision is made for higher air humidities and higher temperatures with low-grade energy and low temperature levels than what a single passage without supply of heat, through the contact humidifier pad 2 had enabled. The heat exchanger and the heat exchanger fan may be replaced by an electric heater for a more compact design, for instance a so-called PTC heater having a low Curie point which automatically limits excess temperatures. Optional source of heat is possible to use to heat up the recirculated air.

An outlet fan 11 is placed in the end of the chain for feeding, through a pad moistener 12 in the contact humidifier pad 2, recirculated humidified air 5 to the consumers.

As is also shown in FIG. 1, a filter 10 is placed first in the shown air current chain, the new non-humidified air 9 having passed said filter 10. All ozone, VOC, particle, virus, and bacteria separation takes place in this filter 10. The filter 10 may also be placed at the end of the chain, i.e., before or after the outlet fan 11.

If it also is desired to use the system according to FIG. 1 for individual cooling, the speed of the heat exchanger fan 7 or the power of the heater can be reduced, the process becoming more alike the curve shown in FIG. 4 below, the low pressure together with the low air humidity in the cabin then allows a very strong cooling of the air. By a reheater, the temperature can also be individually raised. That is, it is possible to get individual temperature control over a wide temperature range in the same unit without using a separate refrigerating machine.

Figure 2:
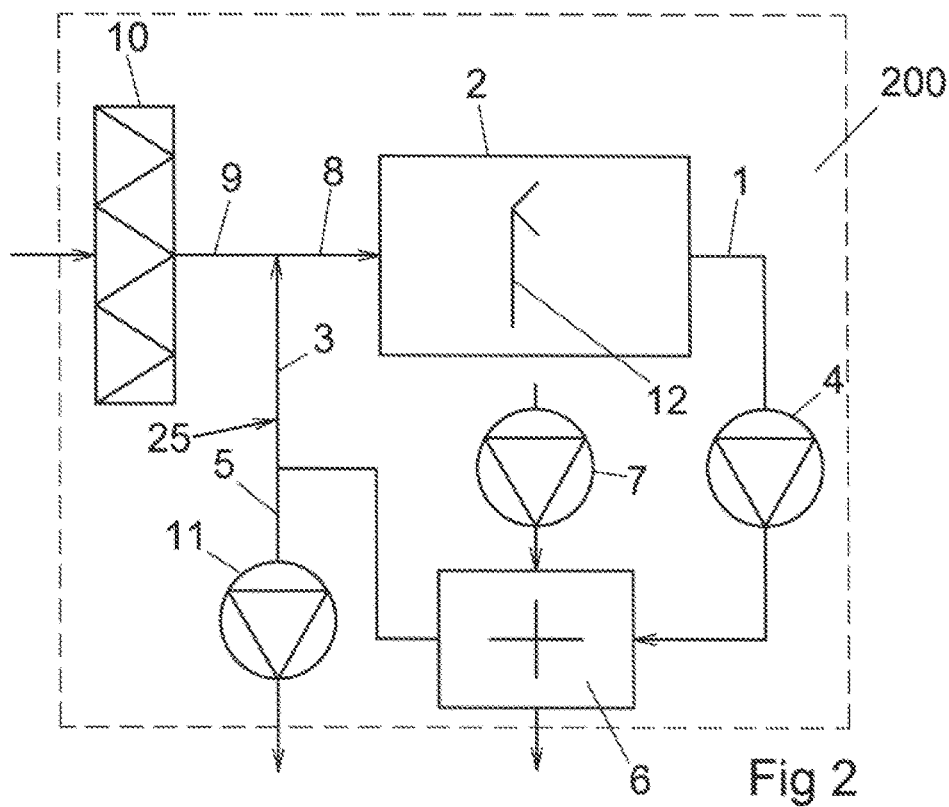
FIG. 2 shows a second embodiment of the invention.

FIG. 2 shows a second embodiment of the invention. This embodiment shows a humidifier 200 of recirculation type which delivers a somewhat more heated air to said consumers. The structure of the recirculation humidifier according to this embodiment differs from the recirculation humidifier shown in FIG. 1 in that the outlet fan 11 has been placed after the heat exchanger 6 while the recirculation fan 4 has been placed before the heat exchanger 6. In other respects, the devices are equally constructed and corresponding numeral designations apply to both figures.

New non-humidified air 9 is conveyed to the intake 8 of the contact humidifier pad 2 and further into the contact humidifier pad 2 for humidifying through the pad moistener 12. Total amount of moist air from the outlet 1 of the contact humidifier pad 2 is fed by the recirculation fan 4, which is placed before the heat exchanger 6 in the recirculation loop 25, back to the intake 8 of the contact humidifier pad 2 via the heat exchanger 6 with its heat exchanger fan 7. For re-entrance of recirculated moist air 3 in the contact humidifier pad 2, total amount of moist air from the outlet 1 has been divided into recirculated moist air 3 and recirculated moist air 5 which is fed further to consumers by means of the outlet fan 11.

Correspondingly, as has been shown in FIG. 1, a filter 10 is placed first in the humidifying circuit, alternatively, the filter may be placed at the end of the humidifying circuit in a similar way as has been indicated under FIG. 1. Also the description of individual cooling under the first embodiment also applies to this second embodiment. Alternative heating methods also applies to this embodiment, such as electric heater.

Figure 3:
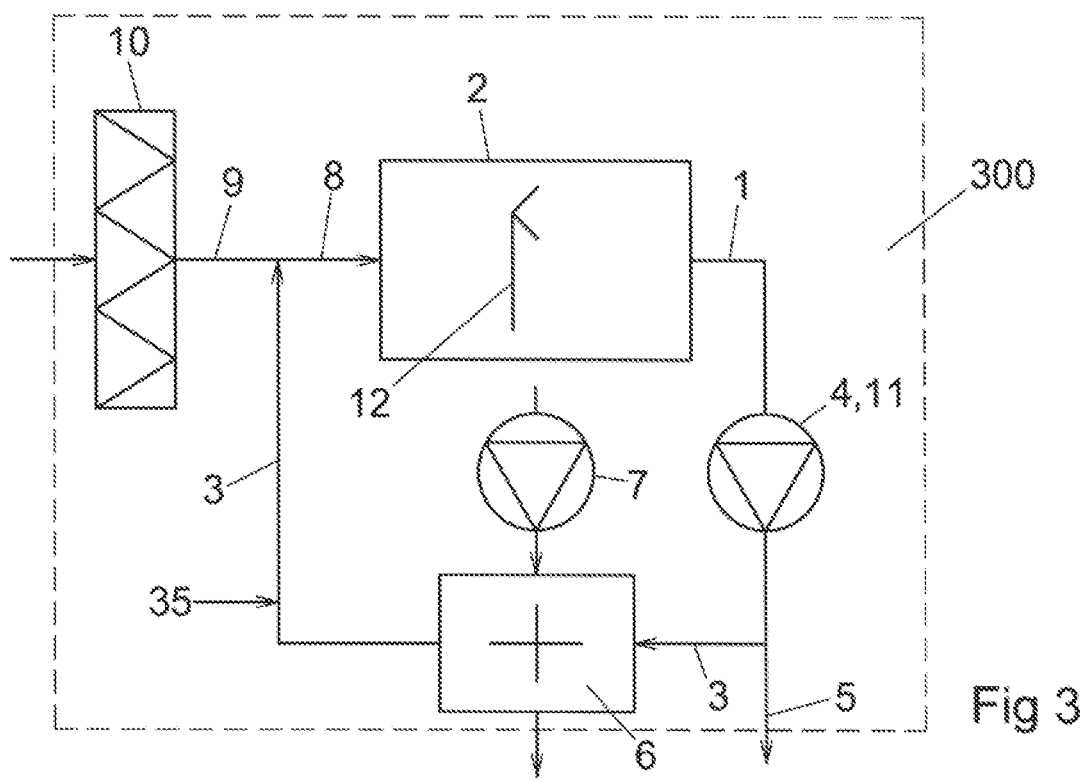
FIG. 3 shows a third embodiment of the invention.

FIG. 3 shows a third embodiment of a humidifier 300 of recirculation type according to the invention having numeral designations that correspond to previously shown embodiments. This third embodiment shows a combined recirculation fan/outlet fan 4, 11, which has been placed for the transportation of the total amount of moist air 1 directly after the contact humidifier pad 2. After passage through this combined fan 4, 11, the total amount of moist air at the outlet 1 is divided into recirculated moist air 5 which is fed further to consumers by means of said combined fan 4, 11 and into recirculated moist air 3 which by said fan is fed further in the recirculation loop 35. The combined recirculation fan/outlet fan 4, 11 may also be placed after the heat exchanger 6. The embodiment in FIG. 3 relies on the pressure drop downstream the combined recirculation fan/outlet fan 4, 11 for the driving force to the consumer 5, the pressure drop may both be fixed or variable. All embodiments are characterized in that the rotational speed of the fans can be varied in order to vary the flows for the variation of cooling effect, degree of humidifying, and flow amount 5 to the consumer.

Figure 4:
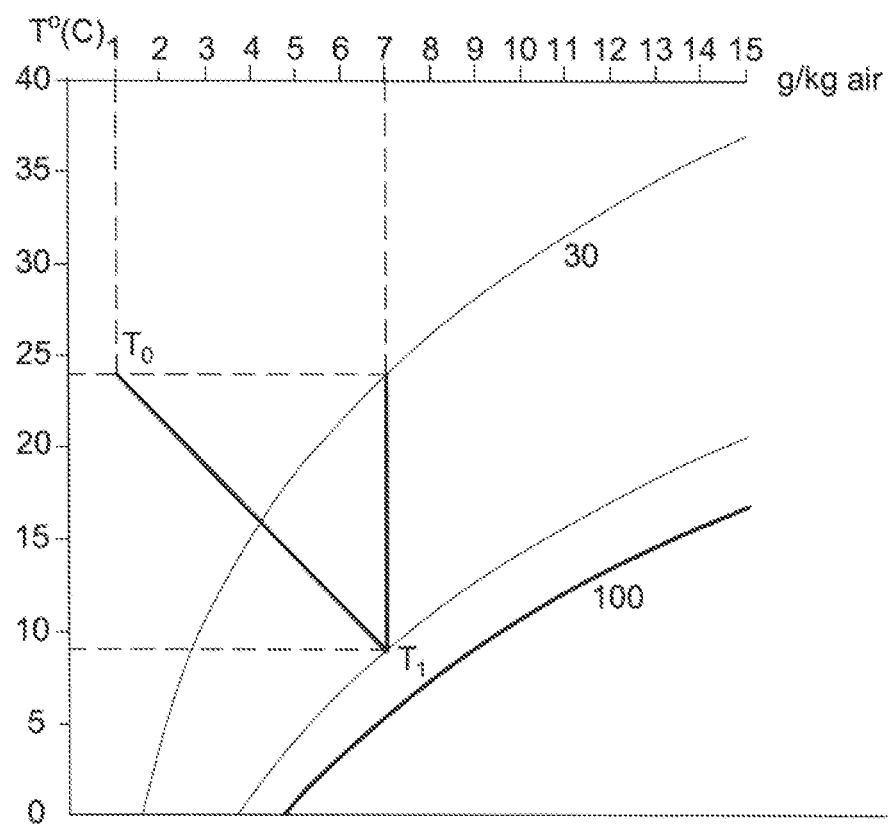
FIG. 4 shows diagrammatically the process for a conventional humidifier.

In FIG. 4, an example is shown of a process diagrammatically of the principle of a normal direct humidifying of total amount of moist air which passes the contact humidifier pad and is fed directly out to consumer without any supplied energy in the form of heating. The y-axis indicates the air temperature and the x-axis indicates the moisture content of the air in g/kg dry air. The straight oblique line shows constant energy content for the humidifying process at $T_0=24°$ C. and the moisture content 1 g/kg air proceeding to $T_1 = 9°$ C. and the moisture content 7 g/kg air, which corresponds to the lowest temperature of the air out of the contact humidifier pad in this example according to the diagram.

Figure 5:
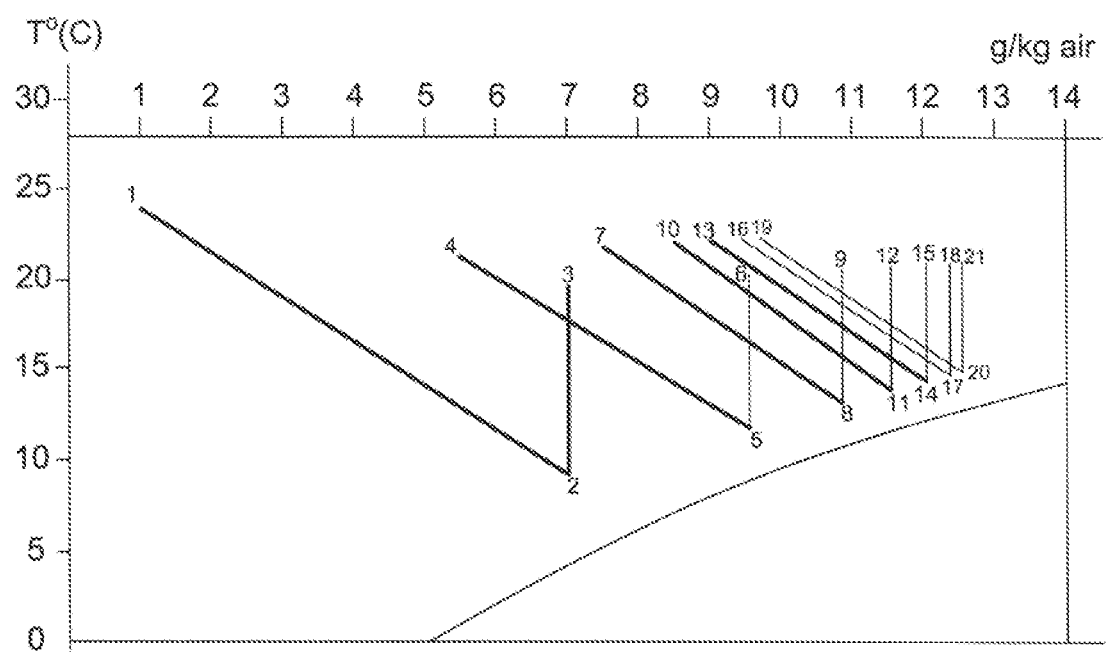
FIG. 5 shows diagrammatically the process according to the present invention.

FIG. 5 shows an example of a process diagrammatically of the principle of circulating humidifying with heating via a heat exchanger according to the present invention. The numerals in the diagram designate the end points of the lines.

From point 1, the air is humidified at the same efficiency down to point 2, the air passes through the heat exchanger and the air is heated with maintained moisture content, to point 3.

The air in point 3 is now to mix with new incoming air (point 1). Since the circulating air has a three times greater flow than the incoming air in this example, it will result in an air mixture which is dominated by point 3, it becomes a mixture which in the diagram consists of point 4, which is seen in that point 4 is ¼ of the distance between point 1 and 3 from point 3 and ¾ of the distance from point 1, which corresponds to the mixing ratio or the flow ratios and the temp.+moisture content of the flows. In the diagram in FIG. 5, approximate measurements may be made using a ruler.

Point 4, that is the mixed air, is now humidified, it humidifies at the same efficiency according to the above down to point 5 after which it is heated by the heat exchanger to point 6.

The air in point 6 is now to mix with new incoming air according to point 1. Since the amount of circulating air still has a three times greater volume than the incoming air in this example, the mixture will result in a mixture which is dominated by point 6, which results in a mixture which in the diagram corresponds to point 7. Using a ruler, it can be seen that point 7 also is ¼ from point 6 and ¾ from point 1.

The air according to point 7, that is the mixed air, is now humidified in the humidifier at the same efficiency according to the above down to point 8 after which the air is heated by the heat exchanger to point 9, the air in point 9 mixing with the air in point 1 and becoming an air mixture according to point 10.

The air mixture according to the point 10 is humidified to the point 11 and is then heated up to the point 12, mixes after that with incoming air according to point 1, and results in an air mixture according to point 13.

The air mixture according to the point 13 is humidified to the point 14, is heated to the point 15, mixes with incoming air according to the point 1, and results in an air mixture according to point 16.

The air mixture according to the point 16 is humidified to the point 17, is heated to the point 18, mixes with incoming air according to the point 1, and results in an air mixture according to point 19. And so on.

The final equilibrium result converges immediately to the right of the last point 21 in the diagram, which for the sake of clarity was not iterated by more steps. The iteration is a method to establish and describe the theoretical performance of the humidifier while the performance in reality is equivalent to the process having reached equilibrium energetically and the air entering the apparatus at point 1 comes out as an air mixture having a temperature and a moisture content which in the diagram corresponds to a location immediately to the right of point 21.

The diagram according to FIG. 5 and thus the performance of the humidifier look different depending on:
1. Input moisture
2. Input temperature
3. The mixing ratio between the recirculation flow and new incoming dry air (that which were 1, 3, and 4 in the examples described above)
4. The air temperature of the surroundings which gives the heat to the heat exchanger
5. The efficiency of the heat exchanger
6. How much ambient air that is driven through the heat exchanger
7. The efficiency of the humidifier When other sources of heat are used, the process looks somewhat different, upon usage of, e.g., electric heater, the heating can be made more efficient since point 3, 6, 9-21, etc., can be driven higher and thereby also the final moisture can be made higher also at smaller recirculation flow.

Then the process gets additional heat from the surroundings via its surrounding surface since the water and the air in the apparatus are colder than the surroundings.

Thus, the diagrams according to FIGS. 4 and 5 show the principles of direct humidifying and circulated humidifying with heat exchanger.

Where no high temperature sources are used, for instance supplied electric heating, the principle shown according to the invention is inherently reliable against overhumidification and exaggerated air humidities with condensate and mold risk as a consequence, it is also inherently protected against excess temperatures since it uses a heat exchanger as source of heat. This unlike if, for instance, an electric heater would be used for a single passage without recirculation, which requires relatively high intake temperatures to be able to reach higher air humidities, which could, upon natural errors or handling faults, generate too high temperature into the pad with extreme humidity as a consequence or, upon lack of water, too high temperature to the consumer. In addition, an electric heater requires extensive protective mechanisms against overheating. However, with recirculation, the heater in the recirculation flow may have a more limited heating of the air to reach high air humidity wherein the above heater problems can be minimized particularly by using so-called PTC heater having a low Curie point, a partial flowing through such a heater with bypass also gives a robust limitation of maximum air temperature.

Figure 6:
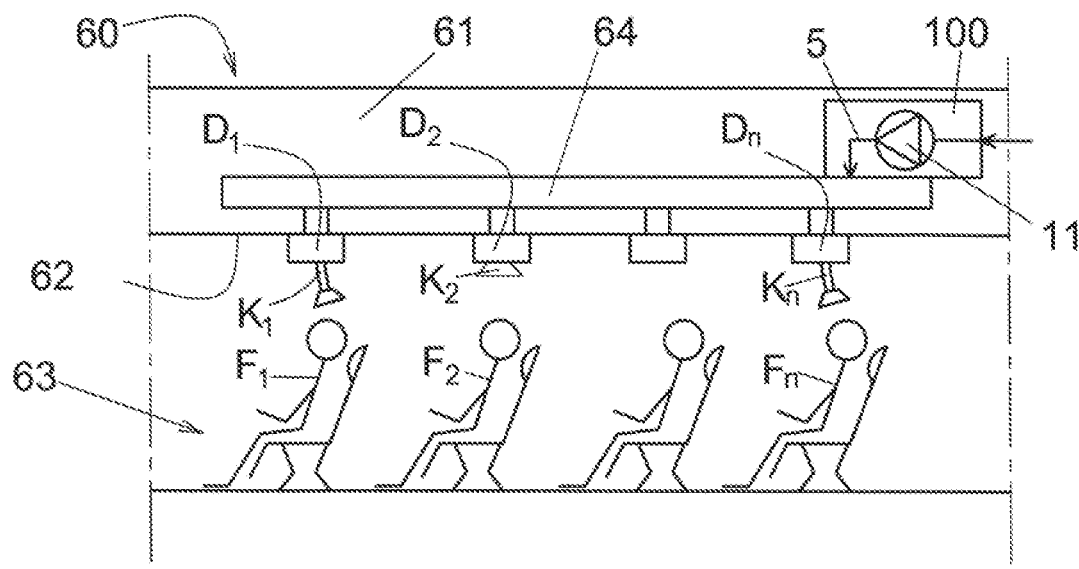
FIG. 6 shows an explanatory sketch of an installation of a humidifier according to the present invention.

FIG. 6 schematically shows an application of an embodiment according to the invention wherein the humidifier 100 of recirculation type is centrally installed in an aircraft 60 in a pressurized space 61. This space may be situated above a ceiling 62 or under a floor in a pressurized zone. For the sake of simplicity, the recirculation humidifier 100 has only been shown with its outlet fan 11, which transports recirculated moist air 5 out to consumers $F_1, F_2, \ldots F_n$. From the recirculation humidifier 100, recirculated moist air 5 is conveyed via a duct system 64 out to individual consumer appliances $D_1, D_2, \ldots D_n$ at which local climate appliances $K_1, K_2, \ldots K_n$ may be individually selected for use by the respective consumer $F_1, F_2, \ldots F_n$.

An alternative embodiment according to FIG. 6 is that air is taken from the trunk by a hose along the side of the cabin, integrates the hose in the chair, and then blows it in front of the passenger. Alternatively, there is a displacement nozzle in each seatback which is blowing on the passenger being behind. Alternatively, it is blowing on a passenger or the space that the passenger is situated in from the ceiling or another suitable position by an adapted nozzle.

An advantage of this low temperature process is that the air does not need to be heated up to so high temperatures. Instead of ambient air, as an alternative it possible to install a low temperature heater in the heat exchanger which, for instance, may consist of a PTC element which only maintains 30-40 degrees maximally.

Figure 7:
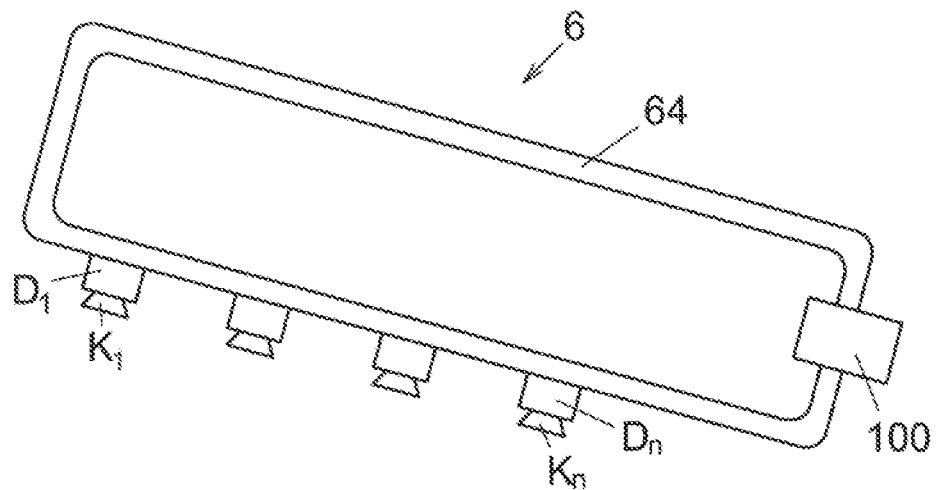
FIG. 7 shows a schematic application where the supply of non-humidified air is handled by a pressing fan.

FIG. 7 shows a schematic application where the supply of non-humidified air is handled by a pressing fan. The heat exchanger 6 of the humidifier consists of a ventilating duct 64 which returns to the humidifier 100. The supply of non-humidified air is demand controlled when a pressure is preserved in the distribution duct 64, upon lower drawing off at the consumers $D_n$ and $K_n$, a smaller rotational speed of the fan is needed for the retention of the pressure. The extent of drawing off in $D_n$ and $K_n$ also controls the need of recirculation, which then also may be made demand controlled.

Figure 8:
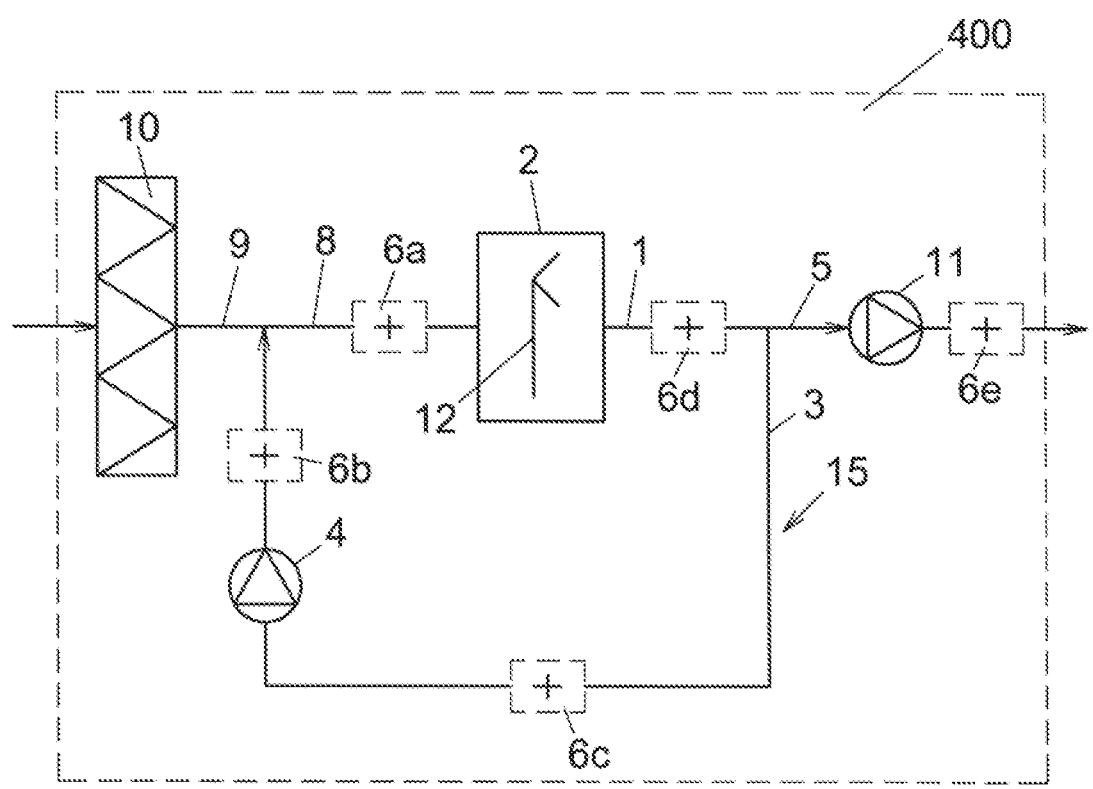
FIG. 8 shows a schematic figure of a humidifier having individual placements of a heater/heat exchanger with or without the appurtenant heat exchanger fan.

FIG. 8 shows a schematic figure of a humidifier 400 having individual placements of a heater/heat exchanger 6a, 6b, 6c, 6d, 6e with or without the appurtenant heat exchanger fan. The other designations in the figure correspond to previously used designations wherein new non-humidified air 9 passes a filter 10 and further to the intake 8 of a humidifier pad and further through a contact humidifier pad 2 with its pad moistener 12. The humidified air passes out from the humidifier 400 via an outlet fan 11. In a similar way as previously has been described, a recirculation loop 15 is arranged for recirculated moist air 3 by means of a recirculation fan 4. Via the outlet for total amount of moist air 1, recirculated moist air 5 flows out from the humidifier by means of outlet fan 11. As is seen in the figure, the placement of the heat exchanger/heater 6 within the scope of the invention may be made in a number of alternative positions, which have been designated a, b, c, d, and e. Preferably, only one of the positions shown is used, whereas a combination of several heat exchangers/heaters may be made according to the placements shown.

The following numeral designations have been used in the description:
1: Outlet for total amount of moist air
2: Contact humidifier pad
3: Recirculated moist air
4: Recirculation fan
5: Recirculated moist air
6: Heat exchanger
7: Heat exchanger fan
8: The intake of the humidifier pad
9: New non-humidified air
10: Filter
11: Outlet fan
12: Pad moistener
15, 25, 35: Recirculation loop
60: Aircraft
61: Pressurized space
62: Ceiling
63: Pressurized cabin
64: Duct system
$D_n$: Individual consumer appliances
$F_n$: Air consumers
$K_n$: Local climate appliances
$P_l$: Low pressure
$P_h$: Higher pressure corresponding to normal cabin air pressure
100, 200, 300: Humidifiers of recirculation type

The invention claimed is:

1. A humidifier for aircraft having a pressurized space, said humidifier comprising a recirculation loop, a recirculation fan placed in the recirculation loop, and an adiabatic contact humidifier device provided with an intake and an outlet, the humidifier being further provided with a source of heat in the form of a heat exchanger, the recirculation loop connected to the outlet and the intake so that a portion of the air that flows through the adiabatic contact humidifier device is recirculated air from the outlet back to the intake so as to there be intermixed with the new non-humidified air to form an air mixture of new non-humidified air and recirculated air, wherein the heat exchanger is placed in the recirculation loop in which the recirculated air passes, said heat exchanger being placed in the pressurized space to receive heated air from the pressurized space for heating the passing recirculated air wherein the adiabatic contact humidifier device is a contact humidifier pad and wherein a portion of the recirculated air is diverted from the recirculation loop for further transportation to consumers.

2. The humidifier according to claim 1, further comprising an outlet fan which is connected to the outlet.

3. The humidifier according to claim 1, further comprising a heat exchanger fan wherein the heat exchanger, the heat exchanger fan, and the recirculation fan are placed in the recirculation loop for heat exchange between ambient air and the recirculated air.

4. The humidifier according to claim 2, wherein the outlet fan is placed outside the recirculation loop.

5. The humidifier according to claim 1, further comprising a duct system connected to the outlet of the adiabatic contact humidifier device.

6. The humidifier according to claim 2, wherein the recirculation loop and the heat exchanger include a duct system which absorbs heat from its environment.

7. The humidifier according to claim 5, in which at least one consumer appliance ($D_1, D_2, \ldots D_n$) is connected to the duct system so that the air mixture can be conveyed locally to the consumers ($F_1, F_2, \ldots F_n$).

8. The humidifier according to claim 7, in which a local climate appliance ($K_1, K_2, \ldots K_n$) is connected to the at least one consumer appliance ($D_1, D_2, \ldots D_n$).

9. The humidifier according to claim 1, further comprising a filter placed in the humidifier either at the entrance of the adiabatic contact humidifier device for the filtering of new non-humidified air or at the outlet of the adiabatic contact humidifier device for the filtering of recirculated air.

10. An aircraft comprising a pressurized space as well as a pressurized cabin, wherein a humidifier according to claim 1 is placed in the pressurized space outside the pressurized cabin.

11. The aircraft according to claim 10, further comprising a duct system connected to the humidifier for the distribution of humidified air, the duct system being placed in said pressurized space and that, to the duct system, at least one consumer appliance ($D_1, D_2, \ldots D_n$) is connected to which at least one local climate appliance ($K_1, K_2, \ldots K_n$) is connected, and in which all said appliances are placed in the pressurized cabin.

12. A method for humidifying air in an aircraft having a pressurized space, the method comprising:
conveying non-humidified air to an intake of an adiabatic contact humidifier pad wherein the air is adiabatically humidified to a higher humidity level subsequently, as recirculated moist air, being conveyed into a recirculation loop for re-transportation to the intake of the adiabatic contact humidifier pad for a repeat of the humidifying, a portion of the recirculated moist air being diverted from the recirculation loop for further transportation to consumers ($F_1, F_2, \ldots F_n$), the recirculation loop comprising the adiabatic contact humidifier pad and a recirculation fan and in which the recirculated moist air in the recirculation loop is first mixed with non-humidified air and then fed directly to the intake of the adiabatic contact humidifier pad and humidified, prior to being directed within the recirculation loop to the recirculation fan and in which a heat exchanger is also positioned in the recirculation loop as a source of heat, the heat exchanger further being placed in the pressurized space of the aircraft to receive pressurized air, wherein the recirculated moist air is being heated by the heat exchanger.

13. The method of claim 12, including regulating the recirculation flow according to the moisture need.

* * * * *